United States Patent
Asai et al.

(10) Patent No.: US 12,378,446 B2
(45) Date of Patent: Aug. 5, 2025

(54) ADHESIVE TAPE

(71) Applicant: TERAOKA SEISAKUSHO CO., LTD., Tokyo (JP)

(72) Inventors: Yuushi Asai, Tokyo (JP); Yuuki Okamura, Tokyo (JP)

(73) Assignee: TERAOKA SEISAKUSHO CO., LTD., Tokyo (JP)

( * ) Notice: Subject to any disclaimer, the term of this patent is extended or adjusted under 35 U.S.C. 154(b) by 294 days.

(21) Appl. No.: 17/971,379

(22) Filed: Oct. 21, 2022

(65) Prior Publication Data

US 2023/0047950 A1    Feb. 16, 2023

Related U.S. Application Data

(63) Continuation-in-part of application No. PCT/JP2020/018015, filed on Apr. 27, 2020, and a continuation-in-part of application No. PCT/JP2021/013274, filed on Mar. 29, 2021.

(51) Int. Cl.
| | |
|---|---|
| C09J 7/38 | (2018.01) |
| B32B 5/02 | (2006.01) |
| B32B 27/12 | (2006.01) |
| B32B 27/32 | (2006.01) |
| C09J 7/29 | (2018.01) |

(52) U.S. Cl.
CPC .............. *C09J 7/383* (2018.01); *B32B 27/12* (2013.01); *B32B 27/32* (2013.01); *C09J 7/29* (2018.01); *B32B 5/024* (2013.01); *B32B 2255/02* (2013.01); *B32B 2255/26* (2013.01); *B32B 2262/04* (2013.01); *B32B 2405/00* (2013.01); *C09J 2401/00* (2013.01); *C09J 2401/006* (2013.01); *C09J 2407/00* (2013.01); *C09J 2423/046* (2013.01); *C09J 2491/00* (2013.01); *C09J 2497/00* (2013.01)

(58) Field of Classification Search
CPC ................ C09J 2497/00; C09J 2491/00; C09J 2423/006; C09J 2423/046; C09J 2407/00; C09J 2401/00; C09J 2401/006; C09J 2400/30; C09J 2301/408; C09J 7/29; C09J 7/383; C08K 5/0016; B32B 2262/04; B32B 2255/02; B32B 2255/26; B32B 27/12; B32B 27/32; B32B 5/024
See application file for complete search history.

(56) References Cited

U.S. PATENT DOCUMENTS

| | | |
|---|---|---|
| 6,583,220 B1 | 6/2003 | Lipman |
| 6,825,246 B1 | 11/2004 | Fattman |
| 6,861,616 B1 | 3/2005 | Kuhl et al. |
| 2004/0260007 A1 | 12/2004 | Yamaguchi et al. |
| 2011/0067799 A1 | 3/2011 | Mussig et al. |
| 2011/0118404 A1* | 5/2011 | Jung .................. C08L 7/00 525/232 |
| 2011/0306677 A1 | 12/2011 | Kataoka |
| 2014/0242377 A1 | 8/2014 | Kopke et al. |

FOREIGN PATENT DOCUMENTS

| | | |
|---|---|---|
| JP | H10-36786 A | 2/1998 |
| JP | H11-61062 A | 3/1999 |
| JP | 2001-515091 A | 9/2001 |
| JP | 2002-525620 A | 8/2002 |
| JP | 2002-528620 A | 9/2002 |
| JP | 2004-250608 A | 9/2004 |
| JP | 2007-161971 A | 6/2007 |
| JP | 2011-519989 A | 7/2011 |
| JP | 2017-128651 A | 7/2017 |
| WO | WO96011235 * | 4/1996 |
| WO | WO-2009/133175 A1 | 11/2009 |
| WO | WO-2010/095578 A1 | 8/2010 |
| WO | WO-2015/056499 A1 | 4/2015 |
| WO | WO-2017146096 A1 * | 8/2017 .......... A61K 31/165 |

OTHER PUBLICATIONS

European Extended Search Report issued in corresponding European Patent Application No. 20933811.0 dated Jan. 19, 2024 (8 pages).
Office Action issued in corresponding Chinese Patent Application No. 202080102465.1 dated Dec. 21, 2023 (14 pages).
International Searching Authority, "International Search Report," issued in connection with International Patent Application No. PCT/JP2021/013274, dated Jun. 8, 2021.
International Searching Authority, "Written Opinion," issued in connection with International Patent Application No. PCT/JP2021/013274, dated Jun. 8, 2021.
International Searching Authority, "International Search Report," issued in connection with International Patent Application No. PCT/JP2020/018015, dated Aug. 11, 2020.
International Searching Authority, "Written Opinion," issued in connection with International Patent Application No. PCT/JP2020/018015, dated Aug. 11, 2020.
Office Action issued in corresponding Korean Patent Application No. 10-2022-7039466 dated Sep. 24, 2024.

\* cited by examiner

*Primary Examiner* — Camie S Thompson
(74) *Attorney, Agent, or Firm* — Foley & Lardner LLP

(57) ABSTRACT

To provide an adhesive tape that is difficult to deform, can suppress stickiness on the sides, and can reduce the emission of greenhouse gases while meeting the required characteristics of adhesive tape, such as adhesive strength and holding force, the present invention use an adhesive tape including a base material, which is a laminate with a backside layer formed on one side of a base fabric by lamination processing; and an adhesive layer disposed on the opposite side of the base material from the backside layer, wherein the backside layer includes a thermoplastic resin including polyolefin and the adhesive layer includes natural rubber, a wood-based filler, a plant-derived plasticizer and a tackifier.

19 Claims, No Drawings

ADHESIVE TAPE

CROSS-REFERENCE TO RELATED APPLICATION

The present application is a Bypass Continuation-In-Part Application of International Application Nos. PCT/JP2020/018015, filed on Apr. 27, 2020, and PCT/JP2021/013274, filed on Mar. 29, 2021. The contents of these applications are incorporated herein by reference in their entirety.

TECHNICAL FIELD

This invention relates to an adhesive tape that is suitably used as packaging and curing materials.

BACKGROUND ART

Conventionally, cloth adhesive tapes with a structure in which a polyethylene resin layer is provided on one side of a woven fabric using rayon spun yarn for the warp and weft yarns and an adhesive layer on the other side are used for packaging, curing, and other applications (e.g., Patent Document 1). The adhesive of the adhesive tape used for such applications is manufactured by kneading a rubber-based adhesive, e.g., natural rubber, to decrease molecular weight and by mixing it with each compounding material. However, adhesive tape using such rubber-based adhesive has problems such as roll deformation when the tape is rolled, stickiness on the side of the roll due to the rubber-based adhesive sticking out from the side of the roll, etc.

The cloth adhesive tape used for packaging, curing, etc. is packed after manufacturing and delivered to retailers or retailers' warehouses, where it is displayed in stores or directly delivered to users. Therefore, there is a risk of deformation due to contact between the tapes during delivery, or the tape sides being subjected to load, causing the packaging material and tape sides to stick together, making the packaging material difficult to peel off, and other defects. Tapes with thick adhesive layers are particularly susceptible to this problem, and there is a need to suppress such deformation and side stickiness.

On the other hand, since the adhesive tape is peeled off and incinerated after being used for packaging or curing purposes, emission of greenhouse gases such as carbon dioxide is a problem when petroleum-derived materials are used in large quantities. Patent Document 2 can be cited as a technology for controlling the emission of greenhouse gases from adhesive tapes. Patent Document 2 discloses a technology for controlling the emission of greenhouse gases from the adhesive tape, which uses bio-based materials for the base material. However, since most of the adhesive components are petroleum-derived materials, a bio-based degree, which is the ratio of bio-based materials in the total material, is low. This has the problem that the effect of reducing the emission of greenhouse gases is limited.

In addition, rubber-based adhesives used for adhesive tapes conventionally contain a large amount of heavy calcium carbonate as a filler, and have been widely used because of their low cost and availability. However, when adhesive tape containing a large amount of heavy calcium carbonate is incinerated, carbon dioxide is generated by calcination of the heavy calcium carbonate, resulting in the emission of a large amount of greenhouse gases.

Therefore, there is a need to use a wood-based filler, which can be substituted for heavy calcium carbonate, in adhesive tapes to reduce the emission of greenhouse gases from incineration. However, when the wood-based filler is used as a filler in an adhesive, the dispersibility of the filler in the adhesive decreases, resulting in a decrease in the smoothness of the adhesive surface due to a decrease in the coating property of the adhesive to the substrate, causing a decrease in adhesive properties.

Furthermore, plasticizers are added to rubber-based adhesives to soften the rubber component, which is the main agent, to improve adhesion to the adherend by improving the coating property to the base material and the smoothness of the adhesive surface. However, when a mineral oil-based plasticizer, which is conventionally used as a plasticizer, is used in an adhesive with wood-based filler as a filler, the mineral oil-based plasticizer is difficult to bond with natural rubber and wood-based filler due to its molecular structure. As a result, bonding strength (cohesion) between each component of the adhesive cannot be obtained, and among the various characteristics required of adhesive tape, there is a problem such as reduced holding force.

LIST OF PRIOR ART DOCUMENTS

Patent Document 1: WO 2009/133175 A1 (US 2011/0067799 A1)

Patent Document 2: WO 2015/056499 A1

SUMMARY OF INVENTION

The object of the present invention is to provide an adhesive tape that is difficult to deform, can suppress stickiness on the sides, and can reduce the emission of greenhouse gases while meeting the required characteristics of adhesive tape, such as adhesive strength and holding force.

The inventors have intensively investigated for dissolving the aforementioned problems, the following configuration has been adopted to solve such problems.

That is, an aspect of the present invention is directed to an adhesive tape including a base material, which is a laminate with a backside layer formed on one side of a base fabric by lamination processing; and an adhesive layer disposed on the opposite side of the base material from the backside layer, wherein the backside layer includes a thermoplastic resin including polyolefin and the adhesive layer includes natural rubber, a wood-based filler, a plant-derived plasticizer and a tackifier.

Another aspect of the present invention is directed to an adhesive tape including a base material made by laminating polyolefin to plant-derived fibers, and an adhesive layer provided on at least one side of the base material, wherein the adhesive layer includes natural rubber, a wood-based filler, a plant-derived plasticizer, and a tackifier.

The adhesive tape of the present invention can improve the shape stability of the adhesive by using a plant-derived wood-based filler, can be less deformable compared to mineral-derived fillers such as heavy calcium carbonate, and can reduce the stickiness on the sides of the tape. By using a plant-derived plasticizer as a softening component of the adhesive, the smoothness of the adhesive surface can be maintained even when the wood-based filler is used, and the reduction in required properties can be suppressed. Furthermore, because the adhesive tape of the present invention contains more plant-derived materials than conventional products, it is possible to control the increase of carbon dioxide in the air due to incineration and to prevent the emission of carbon dioxide due to calcination of heavy calcium carbonate.

EMBODIMENTS OF THE INVENTION

The adhesive tape of the present invention is an adhesive tape including a base material, which is a laminate with a backside layer formed on one side of a base fabric by lamination processing; and an adhesive layer disposed on the opposite side of the base material from the backside layer, or an adhesive tape including a base material made by laminating polyolefin to plant-derived fibers, and an adhesive layer provided on at least one side of the base material.

<Adhesive Layer>

The adhesive layer includes natural rubber, a wood-based filler, a plant-derived plasticizer and a tackifier. Each component is described below.

(Natural Rubber)

The adhesive components used in the adhesive layer of the present invention includes natural rubber.

Natural rubber is solidified from the sap (latex) collected from the rubber tree called Hevea brasiliensis. Natural rubber can be broadly classified into two types: sheet rubber, which is coagulated with formic acid or other acids and dried to form sheets; and block rubber, which is produced by repeatedly crushing and washing cup ramps obtained by natural coagulation in cups for latex collection at rubber plantations, and then pressing after drying.

When referring to natural rubber herein, unless otherwise noted, it does not include liquid natural rubber, which is described below.

The classification of the sheet rubber is based on the rating in "International Standard of Quality and Packing for Natural Rubber Grades" (so-called "Green Book"), and the varieties are defined by raw materials and manufacturing methods. The varieties include Ribbed Smoked Sheet (RSS), which is a sheet obtained from the sap of the rubber tree (natural rubber latex) and dried while being smoked, and Crepe, which is a coagulated sap product washed in water and dried with hot air. Sheet rubbers are classified into grades such as RSS #3, RSS #1, Pale Crepe, and Sole Crepe, and other grades.

The block rubber is solidified small grains of rubber that are washed and dried, then pressed and molded. The block rubber is natural rubber graded according to ISO standards (ISO2000). Standard grades TSR20, TSR10, TSR-CV grades to which hydroxylamine hydrochloride is added as a viscosity stabilizer, and the TSR-L grade to which sodium pyrosulfite is added as a discoloration inhibitor.

When natural rubber is used as the adhesive component (main agent) in the present invention, any one of these grades may be used alone or in combination with multiple grades, depending on the performance required of the adhesive.

In the adhesive component used in the adhesive tape of the present invention, among these classifications and varieties, RSS #3 and TSR-CV grade natural rubbers can be mainly used. RSS #3 natural rubber is widely distributed and has advantages in terms of availability and cost. TSR-CV grade natural rubber has a lower viscosity than RSS and other grades, and the smoothness of the adhesive surface can be improved.

(Wood-Based Filler)

The adhesive layer of the present invention contains a wood-based filler as a filler. Examples of wood-based fillers include powdered cellulose and lignin compounds. Among them, powdered cellulose shows an effect of reinforcing the adhesive due to its fibrous shape. Also, because of its bulkiness, material costs can be reduced by decreasing the amount of adhesive in the tape thickness.

Powdered cellulose can be acid-treated cellulose, which is obtained by grinding cellulose raw materials such as pulp that have been acid hydrolyzed with mineral acids (i.e., inorganic acids) such as hydrochloric acid, sulfuric acid, and nitric acid, or mechanically milled cellulose, which is obtained by grinding pulp that has not undergone acid hydrolysis treatment. Powdered cellulose can be selected and used according to the required performance, etc.

The average particle size of the wood-based filler is preferably 1 μm or more and 50 μm or less. When the average particle diameter is 50 μm or less, the surface smoothness of the adhesive layer is not impaired. If the adhesive surface is not smooth, the adhesive tape may not have sufficient adhesiveness to the adherend and may not exhibit its adhesive performance sufficiently. If the average particle diameter is 1 μm or more, the desired bulkiness can be obtained, the thickness of the adhesive layer can be secured, and the increase in the amount of adhesive in the tape thickness can be suppressed, thereby reducing the increase in material cost. The average particle diameter employed here is the median diameter indicated by D50.

The added amount of the wood-based filler is preferably 10 to 250 parts by mass, more preferably 50 to 150 parts by mass to 100 parts by mass of natural rubber. If the amount is 10 parts by mass or more, the increase in the rubber elasticity of the adhesive can be suppressed and the reduction of the coatability when the adhesive is applied to the base material can be suppressed. On the other hand, if the amount is 250 parts by mass or less, the decrease in rubber elasticity of the adhesive can be suppressed and the decrease in adhesive performance can be prevented.

(Plasticizers)

The adhesive layer of the present invention contains a plant-derived plasticizer as a softening component of the adhesive. Liquid natural rubber, liquid farnesene rubber, soybean oil, sunflower oil, rapeseed oil, cottonseed oil, linseed oil, corn oil, canola oil, palm oil, or modified versions thereof (such as epoxidized soybean oil) can be used as the plant-derived plasticizer. Any one of these plant-derived plasticizers may be used alone, or a plurality thereof may be used in combination.

Using the plant-derived plasticizer as a plasticizer for an adhesive that uses natural rubber as the main agent and wood-based filler as the filler can improve the cohesion between the plasticizer and other components in the adhesive component.

Among them, when liquid natural rubber is used as the plant-derived plasticizer, the dispersibility of each component of the adhesive can be improved because a rapid decrease in viscosity can be suppressed when the adhesive is blended. When vegetable oil such as soybean oil is used, the dispersibility and cohesiveness of each component of the adhesive can be improved because both vegetable oil and wood-based filler have a polar group so as to have a high affinity.

Liquid natural rubber is obtained by depolymerizing natural rubber. Examples of the methods of depolymerizing include, for example, a method for crevating rubber molecular by mechanochemical reaction using shear force with a roller machine or so, a decomposition method due to a photochemical reaction by irradiating the rubber solution with UV light, a chemical oxidative decomposition method using phenylhydrazine, a method of air oxidation in the presence of radical generators, or the like.

The weight average molecular weight (Mw) of liquid natural rubber is preferably 150,000 or less, more preferably 100,000 or less, and even more preferably 50,000 or less.

When the Mw is 150,000 or less, the decrease in wettability of the adhesive layer is suppressed so as to prevent deterioration of sticking properties at low temperature.

The addition amount of the plant-derived plasticizer is preferably 5 to 50 parts by mass to 100 parts by mass of natural rubber, and more preferably 10 to 30 parts by mass. If the amount is 5 parts by mass or more, a decrease in the wettability of the adhesive layer can be suppressed, and deterioration of sticking property at low temperatures can be prevented. If the amount is 50 parts by mass or less, the plasticizer does not bleed, thereby contamination of the adherend and changes over time in adhesive performance can be suppressed.

(Tackifier)

The adhesive layer of the present invention contains a tackifier. By using a plant-derived tackifier as the tackifier, the bio-base degree can be further improved. Examples of the plant-derived tackifiers include terpene resins, terpene phenolic resins, rosin resins, and rosin ester resins. Among them, terpene resins are particularly suitable because of their high bio-based degree and reduced the emission of carbon dioxide. Any one type of tackifier may be used alone, or a plurality of types may be used in combination.

The tackifier is preferably selected from those having a softening point in a range of 70 to 150° C. By having a softening point of 70° C. or higher, the tackifier prevents the adhesive layer from losing adhesive strength and also prevents stickiness on the sides of the adhesive tape. By having a softening point 150° C. or low, the tackifier has excellent compatibility with natural rubber and can suppress the decrease in adhesive strength. The softening point of the tackifier is preferably 80° C. or higher and 125° C. or low. Although product catalogs indicate a variation of ±5° C. in the softening point, the central value shall be taken as the above range and shall encompass these variations.

Examples of the terpene resins include unmodified terpene polymers such as α-pinene polymer, β-pinene polymer, and limonene polymer; and terpene polymers modified by one or more treatments selected from phenolic modification, aromatic modification, hydrogenation modification, and hydrocarbon modification, etc. Examples of the modified terpene polymers include terpene phenolic resin and aromatic-modified terpene resin. Any one of these types may be used alone or in combination.

Examples of the rosin resins include unmodified rosins such as gum rosin, wood rosin, and tall oil rosin; modified rosins in which the unmodified rosins are modified by one or more treatments selected from hydrogenation, disproportionation, polymerization, and chemical modification; various rosin derivatives.

Examples of the rosin derivatives include rosin esters in which the unmodified rosins or modified rosins are esterified with alcohols; unsaturated fatty acid-modified rosins in which the unmodified rosins or the modified rosins are modified with unsaturated fatty acids; unsaturated fatty acid-modified rosin esters in which the rosin esters are modified with unsaturated fatty acids; rosin alcohols in which a carboxyl group in the unmodified rosins, the modified rosins, the unsaturated fatty acid-modified rosins or the unsaturated fatty acid-modified rosin esters is subjected to reduction; metal salts of the rosins such as the unmodified rosins, the modified rosins, and various rosin derivatives, particularly metal salts of the rosin esters; rosin phenolic resins obtained by acid-catalyzed addition and thermal polymerization of phenol to rosins such as the unmodified rosins, the modified rosins, and various rosin derivatives; acid modified rosins in which the unmodified rosins or the modified rosins are modified with acids such as acrylic acid, fumaric acid, or maleic acid; acid modified rosin esters in which the rosin esters are modified with acids such as acrylic acid, fumaric acid, or maleic acid. Any one of these types may be used alone or in combination.

The addition amount of the tackifier is preferably 30 to 150 parts by mass, and more preferably from 60 to 120 parts by mass for 100 parts by mass of natural rubber. If the amount of the tackifier is 30 parts by mass or more, the decrease in adhesive strength can be suppressed, and if the amount is 150 parts by mass or less, the decrease in re-peeling capability when peeling the adhesive tape can be suppressed.

(Other Components)

In addition to the above components, the adhesive layer can contain other components known in the field. Examples thereof include a vulcanizing agent, vulcanization accelerator, a vulcanization aid, an anti-aging agent, a conductive material, a kneading accelerator, a coloring agent, etc.

[Base Material]

The base material used for the adhesive tape is a laminate in which polyolefin is laminated to plant-derived fibers, or a laminate in which a backside layer is formed on one side of the base fabric by lamination.

(Base Fabric)

The fiber materials that make up the base fabric include synthetic fibers such as polypropylene (PP), polyethylene terephthalate (PET) and nylon (N y), or plant-derived fibers such as rayon, cotton, kapok, flax, ramie, hemp, yellow hemp, Manila hemp, sisal, hemp palm, coconut palm and cupra. Any one of these fibers may be used alone or two or more thereof in combination. The mixed spinning of these fibers is optional, and not limited. The base fabric may be woven, knitted, nonwoven, or any other form, and is not particularly limited. From the viewpoint of increasing bio-based degree, it is preferable that the base fabric is composed of plant-derived fibers, and rayon is especially preferred.

(Backside Layer)

The backside layer is composed of a thermoplastic resin containing polyolefin. Examples of polyolefin include high-density polyethylene (HDPE), low-density polyethylene (LDPE), linear low-density polyethylene (LLDPE), polypropylene (PP), ethylene-vinyl acetate copolymer (EVA), ethylene-ethyl acrylate copolymer (EEA) and the like. From the viewpoint of increasing bio-base degree, it is preferable to use bio-polyolefins. Here, the bio-polyolefin means polyolefin produced from bioethanol derived from plants such as sugarcane. The production method of bio-polyolefins is not particularly limited, and various known methods can be employed. For example, commercially available bio-polyethylene can be used as bio-polyolefin. The bio-polyolefin can be used alone or two or more thereof in combination.

[Bio-Based Degree]

In the adhesive tape of the present invention, each material can be selected so that the bio-based degree is 50% or higher. The bio-based degree of an adhesive tape refers to the mass percentage of biomass-derived components in the mass of the entire adhesive tape. The bio-based degree of an adhesive tape can be determined by ISO 16620-4 (Determination of biobased mass content). Specifically, the value is calculated by calculating the mass of the adhesive tape as a whole (A) and the mass of the biomass-derived component (B), and then using the following equation:

$$\text{Bio-Based degree (\%)} = \{\text{mass } (B)/\text{mass } (A)\} \times 100$$

The higher the bio-based degree, the more substantial carbon dioxide emissions can be reduced. In the present invention, the bio-based degree of the adhesive layer can be effectively increased, which is not possible in the past, and it is easy to achieve a bio-based degree of 90% or higher as an adhesive tape. In cases where biomass-derived components are used in part and petroleum-derived components, etc. are used in the remainder, such as in the case of copolymers and combinations of multiple materials, the bio-based degree is calculated according to the percentage of biomass-derived components in each component.

The biomass-derived components used for the adhesive tape of the present invention refer to renewable plant-derived organic resources, and exclude materials that are depleted by mining, such as fossil resources. The biomass-derived components may be, for example, the above renewable organic resources themselves, or materials obtained by chemically or biologically denatured or synthesized using the above organic resources.

The biomass-derived components also release carbon dioxide when incinerated, but since the amount of carbon dioxide released is the same as that absorbed by plants from the air through photosynthesis during their growth, it can be considered to have no effect on the increase or decrease of carbon dioxide in the air. This concept is called carbon neutrality, and by using the biomass-derived components as the constituent materials of the adhesive tape, it is possible to achieve a reduction in the amount of carbon dioxide.

[Manufacturing Method of Adhesive Tape]

The manufacturing method of adhesive tape is not restricted and can be made by any conventionally known method. For example, the base material is made by forming the fibers constituting the base fabric into a desired woven fabric, etc., and then the backside layer is formed to one side by laminating olefin resin to obtain the laminated base material. The laminating method can be any method, such as thermocompression bonding a film of olefin resin over the base fabric, or extrusion molding the olefin resin into the base fabric by thermally melting it. Surface treatment can be applied to the surface of the woven fabric or other material that will form the laminate layer before forming the backside layer. The laminate layer can also be formed on the opposite side of the base fabric from the backside layer.

Next, the separately mixed and prepared adhesive composition is applied to the opposite side (also referred to as the "other side") of the base material from the side where the backside layer is formed to form the adhesive layer. The surface of the base material to which the adhesive composition is applied can be surface treated to improve adhesion.

Physical or chemical anchor treatment (AC treatment) is applied as a surface treatment. Physical treatments include corona, UV, and sputtering treatments, while chemical treatments include the application of resins selected from organotitanium, isocyanate, polyethyleneimine, and polybutadiene series. Physical treatment is preferred from the viewpoint of increasing the bio-based degree.

The adhesive layer is formed by coating the adhesive composition with various coating devices. Examples of the coating devices include, for example, calender coaters, roll coaters, die coaters, lip coaters, Myer bar coaters, gravure coaters, etc.

Otherwise, if necessary, a release layer may be formed on the outer surface of the backside layer to prevent the adhesive from remaining on the back side when rolled.

The thickness of the base material is preferably a range of 50 to 500 μm, more preferably a range of 100 to 300 μm. The thickness of the base material of 50 μm or more improves the rigidity of the base material and makes it easier to work with, while the thickness of 500 μm or less improves adhesion to the uneven surface of the adherend and makes it more difficult to peel off from the adherend. For example, the amount of adhesive applied per side can be in the range of 30 to 400 $g/m^2$ for the adhesive layer. The thickness of the adhesive tape can be selected from 80 to 900 μm, depending on the performance and application required of the adhesive tape.

The manufactured adhesive tape is rolled and cut into predetermined widths. The cut adhesive tape is packaged by protecting the sides with, for example, polyethylene film, or by wrapping each roll individually to prevent the sides of the adhesive tape from contacting each other. Since the adhesive tape of the present invention can effectively suppress stickiness on the tape sides, the side protection film and packaging material can be easily peeled off. Furthermore, by suppressing side stickiness, packaging without protective film or packaging material is also possible.

EXAMPLES

The invention will be specifically described below with reference to examples. However, the invention is not limited only to these examples. The physical properties, etc. of each raw material are based on the manufacturer's catalog values. The presence or absence of "average" also depends on the description in the catalog.

Example 1

Rayon yarns having 30 yarn count was used for both warp and weft yarns to weave a woven fabric with a warp density of 45-threads/inch and a weft density of 35-threads/inch.

Biomass low-density polyethylene (product name "SBC818", density 0.918 $g/cm^3$, manufactured by BRASKEM S. A., hereinafter referred to as "Bio-LDPE") was applied on one side of this woven fabric by extrusion lamination using a T-die at a processing temperature of 300° C. to produce a base material with a total thickness of 200 μm.

Adhesive composition was prepared by mixing the following main agent, filler, plasticizer and tackifier. This adhesive composition was applied to the other side of the woven fabric using a calender coater to obtain a film thickness of 100 μm, so that an adhesive tape with a total thickness of 300 μm was obtained. The bulk density of powdered cellulose (KC Flock W-200) measured by the method described below was 0.33 $g/cm^3$.

TABLE 1

| Type | Produce Name | Amount (parts by mass) |
|---|---|---|
| Main Agent | Natural rubber (RSS #3) (mastication) | 100 |
| Filler | Powdered cellulose (Manufactured by Nippon Paper Industries Co. Product name: KC Flock W-200, Average particle size: 32 μm) | 100 |
| Plasticizer | Liquid natural rubber (Manufactured by DPR INDUTRIES INC., Product name: DPR-40 Average molecular weight (Mw): 40,000) | 25 |

TABLE 1-continued

| Type | Produce Name | Amount (parts by mass) |
|---|---|---|
| Tackifier | Terpene Resin (Manufactured by Yasuhara Chemical Co. Product name: YS Resin PX1000 Softening point: 100 ± 5° C.) | 100 |

Example 2

An adhesive tape with a total thickness of 300 μm was obtained in the same manner as in Example 1, except that liquid natural rubber (trade name "DPR-400" manufactured by DPR INDUSTRIES INC) with a weight average molecular weight (Mw) of 80,000 was used as the plasticizer.

Example 3

An adhesive tape with a total thickness of 300 μm was obtained in the same manner as in Example 1, except that 170 parts by mass of lignin powder (SANX® SCP, manufactured by Nippon Paper Industries). The bulk density of the lignin powder (SANX® SCP) measured by the method described below was 0.48 g/cm$^3$.

Example 4

An adhesive tape with a total thickness of 300 μm was obtained in the same manner as in Example 1, except that soybean white strained oil (product name "Nikka Soybean White Strained Oil", manufactured by J-NIKKA Partners) was used as the plasticizer.

Example 5

An adhesive tape with a total thickness of 300 μm was obtained in the same manner as in Example 1, except that epoxidized soybean oil (product name "ADEKA SIZER O-103P", manufactured by ADEKA) was used as the plasticizer.

Example 6

An adhesive tape with a total thickness of 300 μm was obtained in the same manner as in Example 1, except that refined rapeseed oil (product name "Nikka Rapeseed Oil", manufactured by J-NIKKA Partners) was used as the plasticizer.

Example 7

An adhesive tape with a total thickness of 300 μm was obtained in the same manner as in Example 1, except that linseed oil (product name "Nisshin Linseed Oil" manufactured by Nisshin Oillio Co) was used as the plasticizer.

Example 8

An adhesive tape with a total thickness of 300 μm was obtained in the same manner as in Example 1, except that natural rubber (CV60) was used as the main agent.

Example 9

The adhesive tape with a total thickness of 300 μm was obtained in the same manner as in Example 1, except that 120 parts by mass of powdered cellulose (product name: KC Flock W-400, manufactured by Nippon Paper Industries) with an average particle size of 24 μm were used as the filler. The bulk density of powdered cellulose (KC Flock W-400) measured by the method described below was 0.46 g/cm$^3$.

Example 10

The adhesive tape with a total thickness of 300 μm was obtained in the same manner as in Example 1, except that 80 parts by mass of powdered cellulose (product name: KC Flock W-100, manufactured by Nippon Paper Industries) with an average particle size of 37 μm were used as the filler. The bulk density of powdered cellulose (KC Flock W-100) measured by the method described below was 0.29 g/cm$^3$.

Example 11

The adhesive tape with a total thickness of 300 μm was obtained in the same manner as in Example 1, except that 40 parts by mass of powdered cellulose (product name: KC Flock W-50, manufactured by Nippon Paper Industries) with an average particle size of 45 μm were used as the filler. The bulk density of powdered cellulose (KC Flock W-50) measured by the method described below was 0.14 g/cm$^3$.

Example 12

An adhesive tape with a total thickness of 300 μm was obtained in the same manner as in Example 9, except that liquid natural rubber (trade name "DPR-400" manufactured by DPR INDUSTRIES INC) with a weight average molecular weight (Mw) of 80,000 was used as the plasticizer.

Example 13

An adhesive tape with a total thickness of 300 μm was obtained in the same manner as in Example 1, except that terpene resin (product name "YS Resin PX1250", softening point: 125±5° C., manufactured by Yasuhara Chemical Co.).

Example 14

An adhesive tape with a total thickness of 300 μm was obtained in the same manner as in Example 1, except that terpene resin (product name "YS Resin PX800", softening point: 80±5° C., manufactured by Yasuhara Chemical Co.).

Comparative Example 1

Low-density polyethylene (product name "NUC8008", density 0.918 g/cm$^3$, manufactured by ENEOS NUC Corporation, hereinafter referred to as "LDPE") was applied on one side of the same woven fabric as in Example 1 by extrusion lamination using a T-die at a processing temperature of 300° C. to prepare a base material with a total thickness of 200 μm. By using the base material, an adhesive tape with a total thickness of 300 μm was obtained in the same manner as in Example 1, except that mineral oil (product name: MOBILTHERM 610, manufactured by EMG Lubricants Godo Kaisha) was used as plasticizer.

Comparative Example 2

An adhesive tape with a total thickness of 300 μm was obtained in the same manner as in Comparative Example 1, except that 170 parts by mass of lignin powder (SANX® SCP, manufactured by Nippon Paper Industries).

Comparative Example 3

An adhesive tape with a total thickness of 300 μm was obtained in the same manner as in Example 1, except that mineral oil (product name: MOBILTHERM 610, manufactured by EMG Lubricants Godo Kaisha) as plasticizer and 200 parts by mass of heavy calcium carbonate with particle size of 12 μm (manufactured by MARUO CALCIUM CO., LTD.) as the filler were used. The bulk density of heavy calcium carbonate measured by the method described below was 0.99 g/cm$^3$.

Comparative Example 4

An adhesive tape with a total thickness of 300 μm was obtained in the same manner as in Comparative Example 3, except that starch powder (soluble first-grade starch, manufactured by Hayashi Pure Chemical Industry Co.) with particle size of 10 μm as the filler were used. The bulk density of starch powder measured by the method described below was 0.65 g/cm$^3$.

Comparative Example 5

An adhesive tape with a total thickness of 300 μm was obtained in the same manner as in Example 1, except that 200 parts by mass of heavy calcium carbonate with particle size of 12 μm (manufactured by MARUO CALCIUM CO., LTD.) as the filler were used.

Comparative Example 6

Rayon yarns having 30 yarn count was used for both warp and weft yarns to weave a woven fabric with a warp density of 45-threads/inch and a weft density of 35-threads/inch. Low-density polyethylene (product name "NUC8008", density 0.918 g/cm$^3$, manufactured by ENEOS NUC Corporation) was applied on one side of this woven fabric by extrusion lamination using a T-die at a processing temperature of 300° C. to produce a base material with a total thickness of 200 μm. The adhesive composition was prepared by mixing 100 parts by mass of natural rubber kneaded by a kneader, 200 parts by mass of heavy calcium carbonate with an average particle size of 12 μm (manufactured by MARUO CALCIUM CO., LTD.) as a filler, 25 parts by mass of process oil (product name "MOBILTHERM 610", manufactured by EMG Lubricants Godo Kaisha) as a plasticizer, and 100 parts by mass of C5 resin (product name: T-REZ RC100, manufactured by JXTG Energy, softening point: 95-105° C.) as a tackifier. This adhesive composition was applied to the above base material using a calender coater to obtain a film thickness of 100 μm and an adhesive tape with a total thickness of 300 μm.

Reference Example 1

An adhesive tape with a total thickness of 300 μm was obtained in the same manner as in Example 1, except that 100 part by mass of terpene resin (trade name "YS Resin PX300" manufactured by Yasuhara Chemical Co.) was used as the tackifier.

Reference Example 2

An adhesive tape with a total thickness of 300 μm was obtained in the same manner as in Example 1, except that the amount of the filler was changed to 5 parts by mass.

Reference Example 3

An adhesive tape with a total thickness of 300 μm was obtained in the same manner as in Example 1, except that the amount of the filler was changed to 300 parts by mass.

<Evaluation Method>

The tape samples obtained from each of Examples, Comparative Examples, and Reference Examples were evaluated according to the following methods. The results are shown in Tables 2 through 5.

[Adhesive Strength]

Adhesive strength was measured according to Section 10 (Adhesive strength) of JIS Z 0237 (Testing methods of pressure-sensitive adhesive tapes and sheets). Here, the test conditions were as follows:

Adhesive tape width: 10 mm,
Peeling angle: 180°,
Test temperature: 23° C.

[Holding Force]

Holding force was measured according to Section 13 (Holding force) of JIS Z 0237 (Testing methods of pressure-sensitive adhesive tapes and sheets). Here, the test conditions were as follows:

Area of adhesive tape: width 25 mm×length 25 mm,
Weight: 1000 g,
Test temperature: 40° C.

[Constant Load Peeling]

The tape with 10-mm width was applied to a stainless steel (SUS304BA) plate in an environment of 23° C. and 50% RH, and a 2-kg rubber roller was used to press the tape back and forth once. After 30 minutes of standing in the same environment, 100-g weight was suspended from the end of the tape and a load was applied in a 90-degree direction, and the time until the tape fell was measured at room temperature (23° C.).

[Yield Point Load]

A rolled sample, 50-mm width and 25-m wound, was sandwiched between two parallel plates with only the sides of the tape in contact under an environment of 23° C. and 50% RH. The stress to failure was measured using a compression tester and the yield point load value was obtained.

[Side Stickiness]

A rolled sample, 50-mm width and 25-m wound, was used and polyethylene packing was placed on the side surface of the roll. Five such rolls were stacked and left in a dryer adjusted to 40° C. for 28 days, and after returning to room temperature, the stickiness on the sides of the bottom roll was judged using the following criteria:

A: Polyethylene packing can be easily peeled off.
B: Polyethylene packing can be peeled off, but resistance is felt when peeling it off.
C: Polyethylene packing is not easily peeled off.

[Bulk Density]

After filling the 200-ml measuring cylinder with filler without load up to the opening of the cylinder, the legs of the cylinder collided with the top of the desk by free-falling it onto the desk from a height of 10 mm. After repeating this collision 10 times, the volume of filler was determined from the scale of the cylinder. The filler was then removed from the cylinder and its mass was measured to obtain the bulk density of the filler from the following equation (n=arithmetic mean of 10 times):

Bulk density (g/cm$^3$)=mass of filler (g)/volume of filler (cm$^3$)

In the present invention, the ratio of the parts by mass of wood-based filler to 100 parts by mass of natural rubber and the bulk density of wood-based filler are the values expressed by the following equation:

$$\text{Ratio} = \frac{\text{the parts by mass of wood-based filler to 100 parts by mass of natural rubber}}{\text{the bulk density of wood-based filler}}$$

TABLE 2

| Item | Example 1 | Example 2 | Example 3 | Example 4 | Example 5 |
|---|---|---|---|---|---|
| Laminate layer | Bio-LDPE | Bio-LDPE | Bio-LDPE | Bio-LDPE | Bio-LDPE |
| Main agent | RSS#3 | RSS#3 | RSS#3 | RSS#3 | RSS#3 |
| Tackifier | Terpene Resin | Terpene Resin | Terpene Resin | Terpene Resin | Terpene Resin |
| (Softening point: S.P.) | (S.P.: 100° C.) | (S.P.: 100° C.) | (S.P.: 100° C.) | (S.P.: 100° C.) | (S.P.: 100° C.) |
| Filler | Powdered cellulose | Powdered cellulose | Lignin powder | Powdered cellulose | Powdered cellulose |
| (Particle size: P.S.) | (P.S.: 32 μm) | (P.S.: 32 μm) | | (P.S.: 32 μm) | (P.S.: 32 μm) |
| Plasticizer | Liquid natural rubber (Mw = 40,000) | Liquid natural rubber (Mw = 80,000) | Liquid natural rubber (Mw = 40,000) | Soybean white strained oil | Epoxidized soybean oil |
| Thickness of tape [μm] | 300 | 300 | 300 | 300 | 300 |
| Bio-based degree [%] | 98.6 | 98.7 | 98.6 | 98.6 | 98.6 |
| Adhesive strength [N/10 mm] | 4.6 | 4.1 | 2.9 | 3.8 | 3.7 |
| Holding force [min] | 41 | 43 | 20 | 32 | 50 |
| Constant load peeling [min] | 33 | 60 | 26 | 36 | 40 |
| Yield point load [N/cm$^2$] | 126.8 | 128.1 | 122.3 | 119.3 | 121.8 |
| Side stickiness | A | A | A | A | A |

| Item | Example 6 | Example 7 |
|---|---|---|
| Laminate layer | Bio-LDPE | Bio-LDPE |
| Main agent | RSS#3 | RSS#3 |
| Tackifier | Terpene Resin | Terpene Resin |
| (Softening point: S.P.) | (S.P.: 100° C.) | (S.P.: 100° C.) |
| Filler | Powdered cellulose | Powdered cellulose |
| (Particle size: P.S.) | (P.S.: 32 μm) | (P.S.: 32 μm) |
| Plasticizer | Refined rapeseed oil | Linseed oil |
| Thickness of tape [μm] | 310 | 300 |
| Bio-based degree [%] | 98.6 | 98.6 |
| Adhesive strength [N/10 mm] | 3.9 | 2.3 |
| Holding force [min] | 31 | 23 |
| Constant load peeling [min] | 35 | 26 |
| Yield point load [N/cm$^2$] | 121.3 | 120.1 |
| Side stickiness | A | A |

TABLE 3

| Item | Example 8 | Example 9 | Example 10 | Example 11 | Example 12 |
|---|---|---|---|---|---|
| Laminate layer | Bio-LDPE | Bio-LDPE | Bio-LDPE | Bio-LDPE | Bio-LDPE |
| Main agent | CV60 | RSS#3 | RSS#3 | RSS#3 | RSS#3 |
| Tackifier | Terpene Resin | Terpene Resin | Terpene Resin | Terpene Resin | Terpene Resin |
| (Softeningpoint: S.P.) | (S.P.: 100° C.) | (S.P.: 100° C.) | (S.P.: 100° C.) | (S.P.: 100° C.) | (S.P.: 100° C.) |
| Filler | Powdered cellulose | Powdered cellulose | Powdered cellulose | Powdered cellulose | Powdered cellulose |
| (Particle size: P.S.) | (P.S: 32 μm) | (P.S: 24 μm) | (P.S: 37 μm) | (P.S: 45 μm) | (P.S: 24 μm) |
| Plasticizer | Liquid natural rubber (Mw = 40,000) | Liquid natural rubber (Mw = 40,000) | Liquid natural rubber (Mw = 40,000) | Liquid natural rubber (Mw = 40,000) | Liquid natural rubber (Mw = 80,000) |
| Thickness of tape [μm] | 300 | 300 | 300 | 300 | 300 |
| Bio-based degree[%] | 98.6 | 98.8 | 98.5 | 98.5 | 98.6 |
| Adhesive strength [N/10 mm] | 3.9 | 3.3 | 4.3 | 4.8 | 4.1 |
| Holding force [min] | 56 | 23 | 31 | 23 | 43 |

TABLE 3-continued

| | | | | | |
|---|---|---|---|---|---|
| Constant load peeling [min] | 28 | 31 | 24 | 29 | 60 |
| Yield point load [N/cm²] | 120.8 | 121.9 | 119.5 | 128.6 | 128.1 |
| Side stickiness | A | A | A | A | A |

| Item | Example 13 | Example 14 |
|---|---|---|
| Laminate layer | Bio-LDPE | Bio-LDPE |
| Main agent | RSS#3 | RSS#3 |
| Tackifier | Terpene Resin | Terpene Resin |
| (Softeningpoint: S.P.) | (S.P.: 125°C) | (S.P.:80° C.) |
| Filler | Powdered cellulose | Powdered cellulose |
| (Particle size: P.S.) | (P.S: 32 μm) | (P.S: 32 μm) |
| Plasticizer | Liquid natural rubber | Liquid natural rubber |
| | (Mw = 40,000) | (Mw = 40,000) |
| Thickness of tape [μm] | 300 | 300 |
| Bio-based degree[%] | 98.5 | 98.5 |
| Adhesive strength [N/10 mm] | 3.5 | 2.7 |
| Holding force [min] | 32 | 20 |
| Constant load peeling [min] | 47 | 86 |
| Yield point load [N/cm²] | 127.4 | 119.8 |
| Side stickiness | A | A |

TABLE 4

| Item | Comp. Ex 1 | Comp. Ex 2 | Comp. Ex 3 | Comp. Ex 4 | Comp. Ex 5 | Comp. Ex 6 |
|---|---|---|---|---|---|---|
| Laminate layer | LDPE | LDPE | Bio-LDPE | Bio-LDPE | Bio-LDPE | LDPE |
| Main agent | RSS#3 | RSS#3 | RSS#3 | RSS#3 | RSS#3 | RSS#3 |
| Tackifier | Terpene Resin | Terpene Resin | Terpene Resin | Terpene Resin | Terpene Resin | C5 Resin |
| (Softening point: S.P.) | (S.P.: 100° C.) | (S.P.: 100° C.) | (S.P.: 100° C.) | (S.P.: 100° C.) | (S.P.: 100° C.) | (S.P.: 100±5° C.) |
| Filler | Powdered cellulose | Lignin powder | Heavy CaCO3 | Starch powder | Heavy CaCO3 | Heavy CaCO3 |
| (Particle size: P.S.) | (P.S.: 32 μm) | | (P.S.: 12 μm) | (P.S.: 10 μm) | (P.S.: 12 μm) | (P.S.: 12 μm) |
| Plasticizer | Mineral oil | Mineral oil | Mineral oil | Mineral oil | Liquid natural rubber | Mineral oil |
| | | | | | (Mw = 40,000) | |
| Thickness of tape [μm] | 300 | 300 | 300 | 300 | 300 | 300 |
| Bio-based degree [%] | 77.3 | 77.7 | 70.9 | 81.0 | 77.2 | 49.6 |
| Adhesive strength [N/10 mm] | 4.3 | 4.5 | 4.7 | 1.9 | 4.1 | 4.9 |
| Holding force [min] | 14 | 14 | 13 | 9 | 37 | 24 |
| Constant load peeling [min] | 26 | 27 | 35 | 6 | 24 | 47 |
| Yield point load [N/cm²] | 122 | 121 | 82.5 | 81.7 | 85.6 | 90.5 |
| Side stickiness | B | B | C | C | C | C |

TABLE 5

| Item | Reference Example 1 | Reference Example 2 | Reference Example 3 |
|---|---|---|---|
| Laminate layer | Bio-LDPE | Bio-LDPE | Bio-LDPE |
| Main agent | RSS#3 | RSS#3 | RSS#3 |
| Tackifier | Terpene Resin | Terpene Resin | Terpene Resin |
| (Softening point: S.P.) | (S.P.: 70° C.) | (S.P.: 100° C.) | (S.P.: 100° C.) |
| Filler | Powdered cellulose | Powdered cellulose | Powdered cellulose |
| (Particle size: P.S.) | (P.S.: 32 μm) | (P.S.: 32 μm) | (P.S.: 32 μm) |
| Plasticizer | Liquid natural rubber | Liquid natural rubber | Liquid natural rubber |
| | (Mw = 40,000) | (Mw = 40,000) | (Mw = 40,000) |
| Thickness of tape [μm] | 300 | 900 | 300 |
| Bio-based degree [%] | 98.5 | 98.5 | 98.5 |
| Adhesive strength [N/10 mm] | 1.4 | 4.3 | 0.4 |
| Holding force [min] | 15 | 30 | 0 |
| Constant load peeling [min] | 8 | 42 | 0 |
| Yield point load [N/cm²] | 117.5 | 100.5 | 153.5 |
| Side stickiness | A | B | A |

As shown in Tables 2-4, the conventional adhesive tape (Comparative Example 3), which used heavy calcium carbonate as a filler and mineral oil as a plasticizer, had a low bio-based degree and a lot of stickiness on the sides. In Comparative Examples 1 and 2, where cellulose and lignin were used as fillers, side stickiness was reduced, but in comparison with each example, there was resistance when peeling-off the polyethylene packing, and the improvement in side stickiness was not satisfactory. In Comparative Example 5, where plant-derived liquid natural rubber was used as the plasticizer, but heavy calcium carbonate was used as the filler, the side stickiness was not improved. Furthermore, when starch powder was used as a filler (Comparative Example 4), even though it is a polysaccharide composed of the same glucose, the side stickiness was as high as in Comparative Example 3, and there was no improvement effect.

In contrast, by using wood-based filler and a plant-derived plasticizer, the present invention has realized an adhesive tape with a high bio-based degree that meets the various properties required of adhesive tape while at the same time suppressing stickiness on the sides.

INDUSTRIAL APPLICABILITY

As stated above, the adhesive tape of the present invention is resistant to deformation, according to the results of yield point load values, can suppress stickiness on the sides of the tape and can be widely used in various fields, such as packaging and curing, in the same manner as conventional products. In addition, since it is easy to achieve a bio-based degree of 90% or more, greenhouse gas (carbon dioxide) emissions can be suppressed at a high level.

The invention claimed is:

1. An adhesive tape comprising a base material, which is a laminate with a backside layer formed on one side of a base fabric by lamination processing, and an adhesive layer disposed on the opposite side of the base material from the backside layer, wherein
the backside layer comprises a thermoplastic resin including polyolefin,
the adhesive layer comprises:
natural rubber,
a wood-based filler,
a plant-derived plasticizer, and
a tackifier, and
the adhesive layer comprises 10 to 250 parts by mass of the wood-based filler, 5 to 50 parts by mass of the plant-derived plasticizer, and 30 to 150 parts by mass of the tackifier to 100 parts by mass of natural rubber.

2. The adhesive tape according to claim 1, wherein the ratio of the parts by mass of the wood-based filler to 100 parts by mass of natural rubber and the bulk density of the wood-based filler is 200 or more and 400 or less.

3. The adhesive tape according to claim 1, wherein the wood-based filler is powdered cellulose.

4. The adhesive tape according to claim 1, wherein the plant-derived plasticizer is liquid natural rubber.

5. The adhesive tape according to claim 1, wherein the tackifier is a plant-derived tackifier.

6. The adhesive tape according to claim 5, wherein the plant-derived tackifier is terpene resin.

7. The adhesive tape according to claim 1, wherein the tackifier comprises a tackifier having a softening point of 70 to 150° C.

8. The adhesive tape according to claim 1, wherein the base fabric is composed of plant-derived fibers.

9. The adhesive tape according to claim 1, wherein the backside layer comprises bio-polyolefin as the polyolefin.

10. The adhesive tape according to claim 9, wherein the bio-polyolefin is bio-polyethylene.

11. An adhesive tape comprising a base material, in which polyolefin is laminated to plant-derived fibers, and an adhesive layer provided on at least one side of the base material,
wherein the adhesive layer comprises natural rubber, a wood-based filler, a plant-derived plasticizer, and a tackifier, and
the adhesive layer comprises 10 to 250 parts by mass of the wood-based filler, 5 to 50 parts by mass of the plant-derived plasticizer, and 30 to 150 parts by mass of the tackifier to 100 parts by mass of natural rubber.

12. The adhesive tape according to claim 11, wherein the wood-based filler is powdered cellulose.

13. The adhesive tape according to claim 11, wherein the plant-derived plasticizer is liquid natural rubber.

14. The adhesive tape according to claim 11, wherein the tackifier is a plant-derived tackifier.

15. The adhesive tape according to claim 14, wherein the plant-derived tackifier is terpene resin.

16. The adhesive tape according to claim 11, wherein the tackifier comprises a tackifier having a softening point of 70 to 150° C.

17. The adhesive tape according to claim 11, wherein the backside layer comprises bio-polyolefin as the polyolefin.

18. The adhesive tape according to claim 17, wherein the bio-polyolefin is bio-polyethylene.

19. An adhesive tape comprising a base material, which is a laminate with a backside layer formed on one side of a base fabric by lamination processing, and an adhesive layer disposed on the opposite side of the base material from the backside layer,
wherein
the backside layer comprises a thermoplastic resin including polyolefin,
the adhesive layer comprises:
natural rubber,
a wood-based filler,
a plant-derived plasticizer, and
a tackifier, and
the ratio of the parts by mass of the wood-based filler to 100 parts by mass of natural rubber and the bulk density of the wood-based filler is 200 or more and 400 or less.

* * * * *